Sept. 10, 1929.  E. POHLIG  1,727,443
CIGAR CUTTER
Filed Jan. 17, 1928
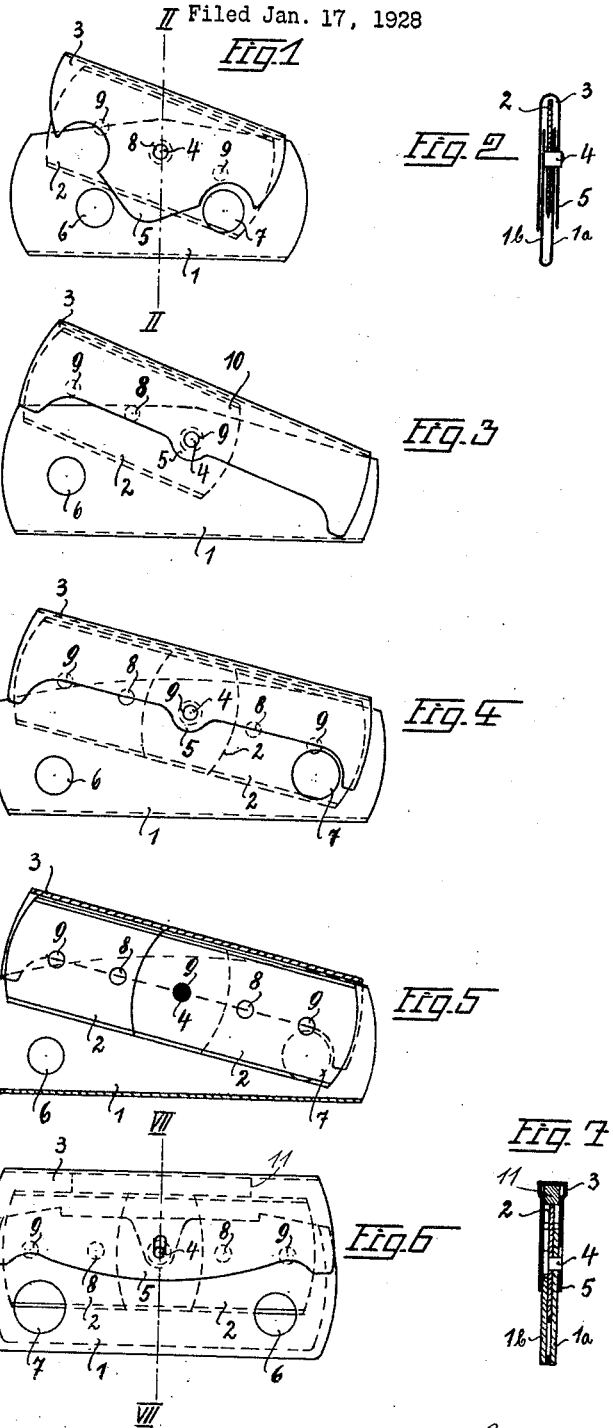

Patented Sept. 10, 1929.

1,727,443

UNITED STATES PATENT OFFICE.

EUGEN POHLIG, OF SOLINGEN, GERMANY.

CIGAR CUTTER.

Application filed January 17, 1928, Serial No. 247,436, and in Germany January 20, 1927.

This invention relates to a cigar cutter of the kind wherein the cutter is composed of a safety-razor blade, and the invention consists in arranging the blade pivotally within a flat casing composed of two shells of U-shaped cross-section one of which embraces the other, the outer shell and the blade being adapted to rock together about the pivot for cutting the tips off cigar ends inserted in an aperture in the inner shell.

Fig. 1 of the accompanying drawings represents a side view of one form of the device, Fig. 2, a section of the same on the line II—II of Fig. 1, Fig. 3, a side view of a modified form, Fig. 4, a side view of a further modification, Fig. 5, a longitudinal section of the latter, Fig. 6, a side view of a still further modification, and Fig. 7, a section on the line VII—VII of Fig. 6.

The cigar cutter consists of one or more safety-razor blades 2 enclosed within a flat casing of steel, aluminium, celluloid or the like composed of two shells 1 and 3 of U-shaped cross-section, the shell 3 being adapted to embrace the shell 1, as shown in Fig. 2. The blade 2 and the outer shell 3 are supported on the inner shell by means of a pivot pin 4 about which they can be rocked together within narrow limits without exposing the edge of the blade, the pivot being arranged relative to the outer shell so that no pivotal displacement between the latter and the blade can take place. Apertures are made in the walls 1ª and 1ᵇ of the inner shell for the reception of the cigar end, the apertures being arranged so as to be traversed by the edge of the blade when the latter is rocked for cutting off the cigar tip. The thin blade 2 fits snugly between the walls 1ª and 1ᵇ which support it and enable it to make a clean cut. The device can easily be operated with one end, and as the blade is covered up within the casing, the hand is protected from injury.

The actual form of the device may be varied according to requirements. In the form shown in Figs 1 and 2, the pivot pin 4 is secured to the wall 1ᵇ of the inner shell and engages in the central aperture 8 of the blade 2 and in a corresponding aperture made in the wall 5 of the outer shell. The inner shell is formed with two sets of apertures 6 and 7 for the reception of the cigar ends, said apertures being arranged at opposite sides of the transverse center line so that both ends of the blade can be used for cigar cutting. The apertures preferably differ in diameter, as shown, so as to suit cigars of different dimensions.

In the form shown in Fig. 3, only one end of the blade is used for cutting, the pivot being inserted in one of the end apertures 9 of the blade. The casing is longer than the blade, the shells being double-armed so as to allow the device to be easily operated with one hand.

Figs. 4 and 5 illustrate the construction wherein an elongated casing is fitted with two overlapping blades arranged with their coinciding end apertures 9 on the pivot 4, the shell 1 being in this case provided with two sets of apertures 6 and 7, one for each blade.

In the constructions so far described, the blade or set of blades is arranged so as to bear with the edge 10 directly against the back of the shell 3. To save the edge from injury when the casing is made of metal, the shell 3 may be provided, as shown in Figs. 6 and 7, with a soft bearing surface in the form of an insertion 11 of suitable material. To facilitate the reversal or exchange of the blades, moreover, the pivot pin 4 is according to Figs. 6 and 7 provided with a head adapted to be clamped between the blade and the adjacent wall of the outer shell, the pin being detachable after the removal of the outer shell. The inner shell has at one side a recess wherein the head of the pin is accommodated, and the shell 3 has in its wall 5 an elongated aperture adapted to slip easily on to the pin when the elements are assembled.

I claim:

1. A cigar cutter comprising a flat casing composed of two shells of U-shaped cross-section one of which embraces the other, a safety-razor blade enclosed between the two shells, and a pivot pin holding the shells and the blade together so as to allow the blade and the outer shell to be rocked together relative to the inner shell, said inner shell being provided with apertures adapted to admit a cigar end and arranged so as to be traversed by the edge of the blade when the latter is rocked the pivot being arranged midway between the ends of the shells and positioned so as to prevent, by the abutment of one shell against the other, the shells from being deflected far enough to expose the edge of the blade.

2. A device as claimed in claim 1 wherein the pivot pin is provided with a head adapted to be clamped between the blade and the adjacent wall of the outer shell for holding the pin in position.

3. A device as claimed in claim 1 wherein the pivot pin is situated above the level of the apertures in the inner shell.

EUGEN POHLIG.